United States Patent [19]

Holliday

[11] 3,957,358
[45] May 18, 1976

[54] VIEWER FOR MICROREPRODUCTION ON A TRANSPARENT FILM

[75] Inventor: Robert G. Holliday, Ann Arbor, Mich.

[73] Assignee: Xerox Corporation, Stamford, Conn.

[22] Filed: Nov. 8, 1974

[21] Appl. No.: 522,122

[52] U.S. Cl. .............................. 350/239; 40/106.1
[51] Int. Cl.² ....................................... G02B 27/02
[58] Field of Search ................... 350/239, 240, 238; 40/106.1

[56] References Cited
UNITED STATES PATENTS
499,380   6/1893   Franz ................................ 350/239

FOREIGN PATENTS OR APPLICATIONS
674,495   11/1964   Italy ................................... 350/239

Primary Examiner—Alfred E. Smith
Assistant Examiner—E. R. LaRoche

[57] ABSTRACT

A device for viewing microreproductions on a transparent film has a lens and a film supporting means which has a pair of frame members adapted to clamp the film therebetween through magnetic attraction of one of the frame members to the other, either the lens or the film support being slidably movable with respect to the other for focusing purposes.

12 Claims, 7 Drawing Figures

U.S. Patent    May 18, 1976    Sheet 1 of 2    3,957,358
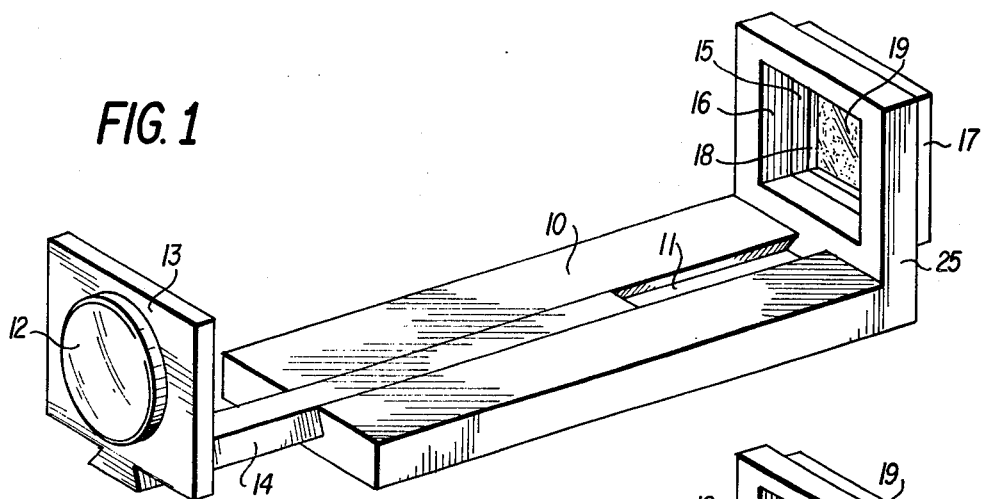
FIG. 1
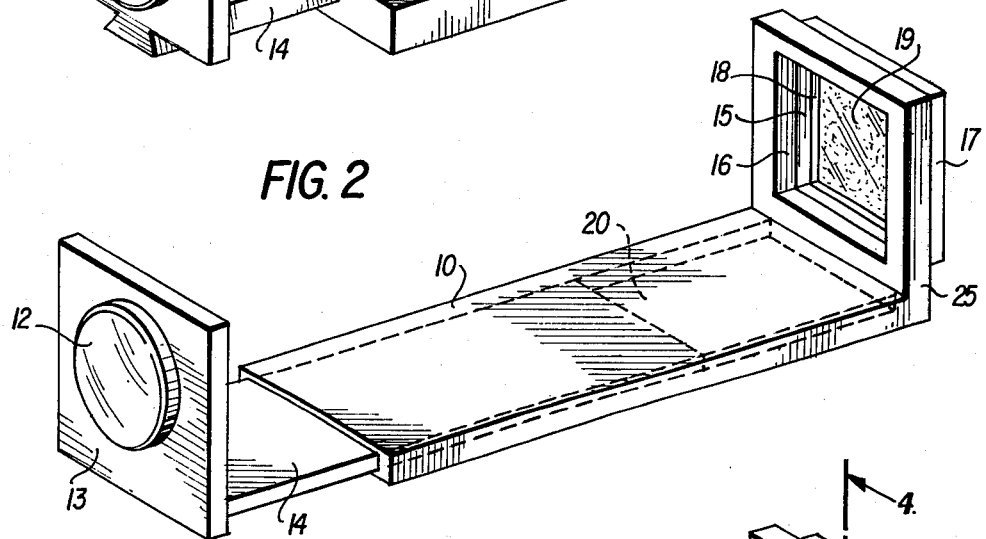
FIG. 2
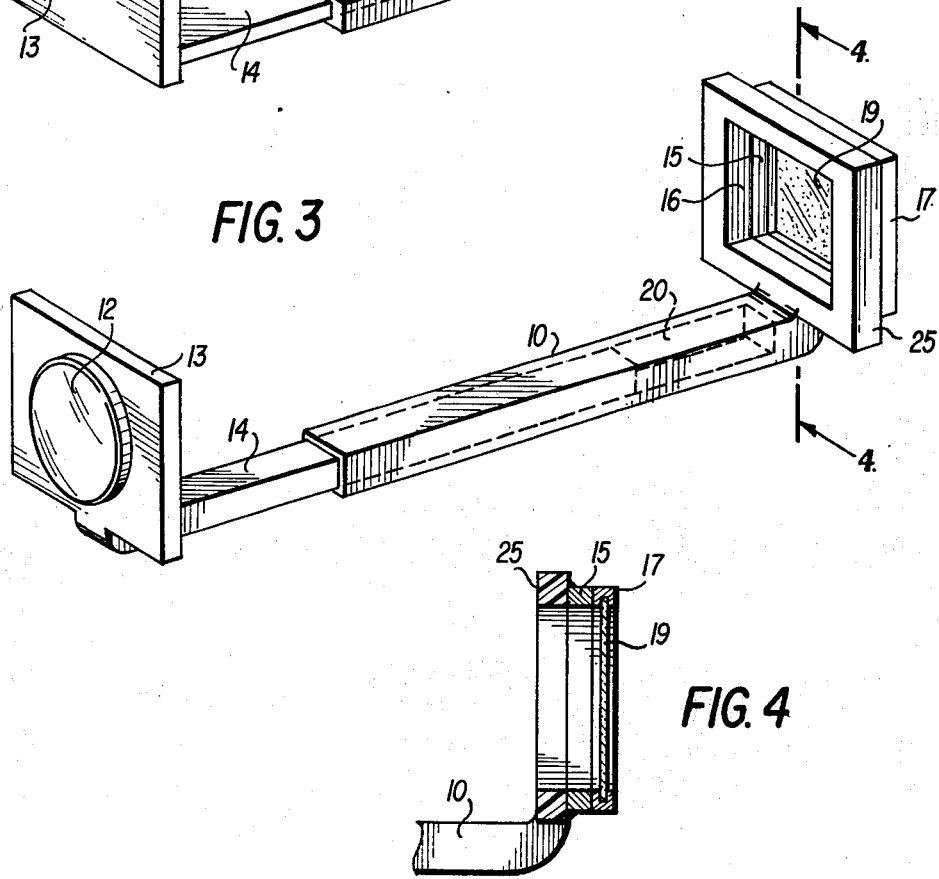
FIG. 3
FIG. 4

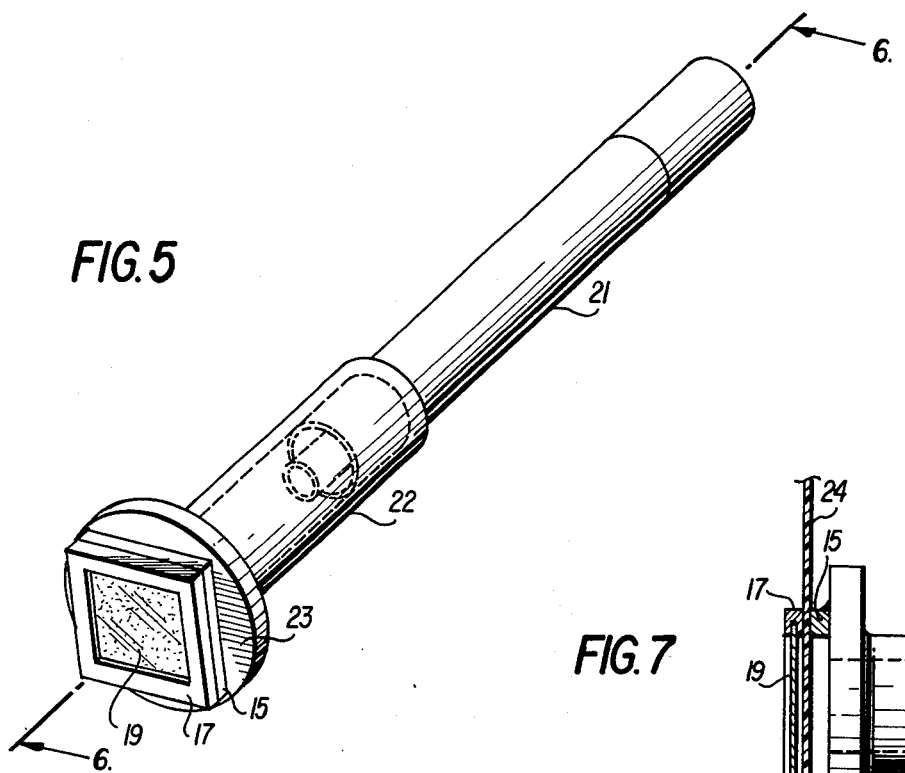
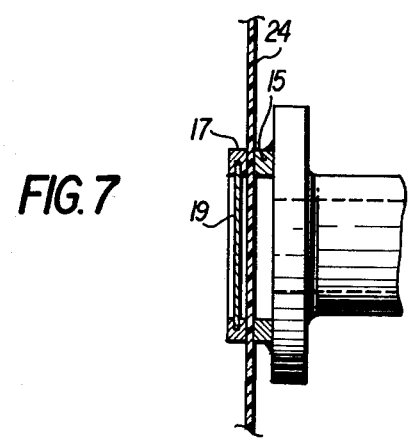
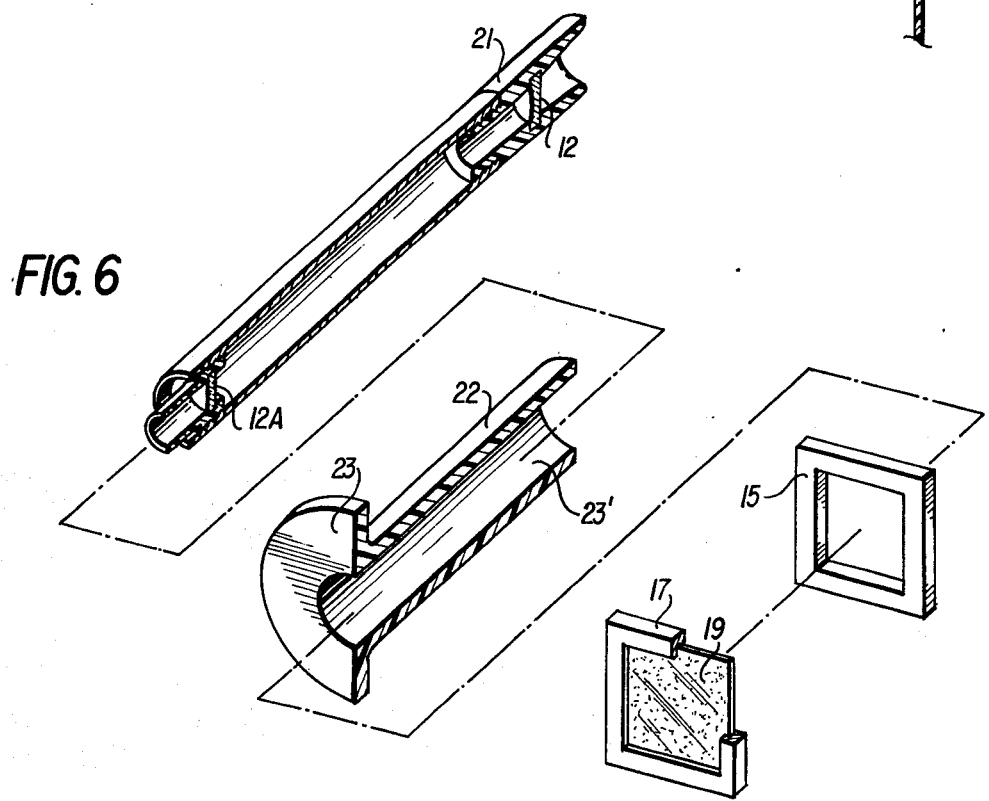

VIEWER FOR MICROREPRODUCTION ON A TRANSPARENT FILM

This invention relates generally to a microreproduction viewing device and more particularly to a novel means for supporting a transparent microreproduction such as a microfiche in association with a lens which magnifies the reproduced subject matter.

The practice of making microreproductions of documents on transparent films such as microfilms or microfiches to conserve storage space is becoming more and more popular. The microreproduction must be inserted in an optical instrument which magnifies the subject matter thereon when it is desired to read or otherwise view it. Optical reading machines are available but most of the heretofore available machines are relatively bulky, complex and expensive. A monocular microreproduction reader is disclosed in U.S. Pat. No. 3,064,528. This device resembles a pair of spectacles to be worn by the reader and does not provide a means for moving the film with respect to the lens for focusing purposes.

It is therefore an object of this invention to provide an improved, small compact device for viewing microreproductions. Another object of the invention is to provide a device with a means for slidably positioning a microreproduction forwardly of a magnifying lens. Still another object of the invention is to provide a small compact viewer having a means for holding a transparent microreproduction with an area thereof positioned properly for viewing through a magnifying lens.

Other objects will become apparent from the following description with reference to the accompanying drawing wherein FIGS. 1 through 3 and 5 are perspective views of different embodiments of the invention;

FIG. 4 is a section taken along the line 4—4 of FIG. 3;

FIG. 7 is a fragmentary side elevation, partially in section, of the embodiment of the microreproduction supporting means illustrated in FIGS. 5 and 6.

The foregoing objects and others are accomplished in accordance with this invention, generally speaking, by providing a device for reading or otherwise viewing a microreproduction of a transparent film such as a microfiche having an opening therein aligned with the lens, a first frame member attached to the support means and a second frame member which is separable from the microreproduction support means but is adapted to cooperate through magnetic attraction with the first frame member to clamp a microreproduction therebetween and across openings surrounded by the frame members. Either the frame member attached to the microreproduction supporting means or the detachable frame member is a magnet and the other frame member is attractable by a magnet.

Referring now to the drawing, the embodiment of the invention illustrated in FIG. 1 has a rectangularly shaped base member 10 having a groove 11 extending longitudinally across the surface thereof with the closed bottom of the groove wider than the open top. A lens 12 is supported in an opening through a support member 13 secured to a slide member 14 having a cross-section corresponding substantially in shape and dimensions to those of groove 11 and adapted to slide therein. A support member 25 having an opening 16 therethrough is secured to base 10 at a point longitudinally spaced from support member 13. An open rectangular magnet 15 is adhesively bonded to support member 25. A frame member 17 having an opening 18 therethrough corresponding substantially to the shape and dimensions of magnetic member 15 and made of steel or other material which is attracted by magnetic member 15 is shown disposed against magnet 15. Preferably the opening 18 through frame member 17 is closed with a white plastic or glass plate 19 which is transparent to light. Plate 19 may be an etched plastic or glass sheet.

The structure of the embodiment of FIG. 1 may be modified by fixing an upstanding lens support member 13 to base 10 and securing the support member 17 to a slide member 14.

A microfiche or the like to be read is inserted between magnet 15 and frame member 17 and is held by magnetic attraction of member 17 to magnet 15 with a portion of the microfiche across openings 16 and 18. Lens support member 13 may be moved towards or away from the supported microfiche for focusing purposes.

The embodiment illustrated in FIG. 2 is similar to the embodiment of FIG. 1 and has a base member 10, a lens 12 supported on upstanding member 13, magnet 15 bonded to support member 25 and surrounding an opening 16 and frame member 17 with an opening 18. An etched plastic sheet 19 extends across opening 18. However, in this embodiment lens support member 13 is secured to an end of parallelopiped shaped member 14 which slides in and out of a similarly shaped cavity 20 in base 10. Operation of this device is similar to that of FIG. 1 with a microfiche held between magnet 15 and frame member 17.

The embodiment illustrated in FIG. 3 is similar to that of FIG. 2 except that the base 10 is a narrow hollow member, rectangular in cross-section, in which slide member 14 slides. As in the embodiment of FIGS. 1 and 2, the support member 13 for lens 12 is fixed to slide member 14 and a microfiche or the like is supported between magnet 15 and frame member 17 with a portion thereof extending across openings 16 and 18 and in front of transparent sheet 19.

The embodiment of the invention illustrated in FIGS. 5 through 7 has a tubular housing 21 supporting longitudinally spaced magnifying lenses 12 and 12A. A tubular synthetic resinous support member 22 has a bore 23' therethrough which is open at both ends. Tubular member 22 is slidably disposed on housing 21 with one end spaced longitudinally from the enclosed end of the housing 21. An annular flange member 23 extends radially outwardly from the wall of tubular member 22 about the open end thereof which is spaced longitudinally from the enclosed end of housing 21. A magnet 15 like those of the embodiments of FIGS. 1 through 3 has an open rectangular cross-section and is adhesively bonded or otherwise secured to the face of flange member 23 to form a frame member about the open end of tubular member 22. A magnetically attractable frame member 17 having a rectangular cross-section corresponding in dimensions with those of the magnet member 15 is adhesively bonded to a rectangular piece of etched glass or plastic 19. As illustrated in FIG. 7, a microfiche 24 is positioned against magnet 15 and held thereagainst by frame member 17 which is attracted by magnet 15. The subject matter on the microfiche 24 is brought into focus with lenses 11 and 12 by sliding member 22 on housing 21.

The housings, base member, lens supporting means and microreproduction supporting means may be made of any suitable metal, wood or plastic material. The frame member which is attractable by a magnet may be steel or other magnetic metal or a plastic containing a magnetic metal. While the lens support means in the embodiments of FIGS. 1 through 3 are slidable relative to the base member, they could be fixed to the base member and the supporting means for the microreproduction could be slidably attached to the base member.

The embodiments of the invention illustrated in FIGS. 1 through 4 have a magnet 15 adhesively or otherwise bonded about an opening 16 to a rectangular frame member 16. In some embodiments of the invention, frame member 25 can be eliminated and the base of rectangular shaped magnet 15 can be secured directly to the base member 10. The magnet 15 can, of course, be of any convenient shape such as circular, elliptical or rectangular provided it has an opening therethrough. The shape of the magnet and of the cooperating frame 17 should be sufficiently similar to clamp a microfiche therebetween.

In operation of the devices of FIGS. 1 through 4, a microfiche is placed against magnet 15 and frame member 17 is disposed on the opposite side of the microfiche in a position with its opening aligned with that of magnet 15. Support frame member 17 is attracted by the magnet 15 and the microfiche is clamped between the magnet 15 and frame member 17. Focusing is achieved by sliding the lens support member 13 to and fro with respect to magnet 15.

Although the invention is described in detail for the purpose of illustration it is to be understood that such detail is solely for that purpose and that variations can be made therein by those skilled in the art without departing from the spirit and scope of the invention except as it may be limited by the claims.

What I claim is:

1. A device for viewing microreproductions on transparent film which comprises a magnifying lens, means for supporting the lens and a means for supporting a microreproduction in association with the lens for magnification thereof, said means for supporting the microreproduction comprising a first frame member having a first opening secured thereto and a separate second frame member having a second opening, said first and second openings being aligned therethrough, one of said frame members being a magnet and the other being attractable by a magnet, whereby a microreproduction disposed between the said frame members is supported thereby across the said first and second openings when the attractable frame member is attracted to the magnet, at least one of said supporting means being slidably movable towards and from the other for focusing purposes.

2. The device of claim 1 wherein the lens is supported in a cylindrical housing, and the supporting means for the microreproduction is a tube open at both ends and having a bore adapted to form a sliding fit on said housing with one end of the tube about the housing and the other end spaced longitudinally from the lens, one of said frame memers is attached to the tube end spaced from the lens and the other frame member is separate from the tube.

3. The device of claim 2 wherein said tube has an annular flange extending radially outwardly from the said longitudinally spaced end and one of the frame members is attached to the flange.

4. The device of claim 1 comprising a base member and wherein the said lens supporting means and the microreproduction supporting means are attached to the base in face to face relationship with the lens aligned with the openings in the said frame members, and at least one of the supporting means is slidably attached to the base member.

5. The device of claim 4 wherein the said base member has a longitudinal groove therein and one of the said supporting means has a protuberance slidably disposed in the groove.

6. The device of claim 5 wherein the lens supporting means is fixed against movement relative to the base member.

7. The device of claim 1 wherein the said separate frame member is secured to a transparent sheet which extends across the opening in the frame.

8. The device of claim 2 wherein the separate frame member is secured to a transparent sheet which extends across the opening in the frame member.

9. The device of claim 4 wherein the separate frame member is secured to a transparent sheet which extends across the opening in the frame member.

10. The device of claim 5 wherein the separate frame member is secured to a transparent sheet which extends the opening in the second frame member.

11. The device of claim 4 wherein the base member has a cavity therein and one of the said supporting means is attached to a slide member disposed in the cavity.

12. The device of claim 11 wherein the base member is a housing which is rectangular in cross-section.

* * * * *